United States Patent Office 3,404,146
Patented Oct. 1, 1968

3,404,146
3-OLEOYL-3-AZABICYCLO[3.2.2]NONANE
Evald L. Skau, Robert R. Mod, and Frank C. Magne, New Orleans, La., assignors to the United States of America as represented by the Secretary of Agriculture
No Drawing. Original application Apr. 2, 1964, Ser. No. 361,925, now Patent No. 3,248,396, dated Apr. 26, 1966. Divided and this application Sept. 10, 1965, Ser. No. 509,450
1 Claim. (Cl. 260—239)

ABSTRACT OF THE DISCLOSURE

A number of N-acyl derivatives of cyclic imines have been found to be compatible plasticizers for vinyl chloride homopolymers, copolymers of vinyl chloride with vinyl acetate, and for nitrile rubbers. The plasticizers are N,N-disubstituted long chain aliphatic amides. When the acyl moiety is saturated, it is derived from an alkanoic acid having from 10 to 18 carbon atoms. If unsaturated, the acyl moiety is derived from an alkenoic acid having from 18–22 carbon atoms.

---

A nonexclusive, irrevocable, royalty-free license in the invention herein described, throughout the world for all purposes of the United States Government, with the power to grant sublicenses for such purposes, is hereby granted to the Government of the United States of America.

This application is a division of Ser. No. 361,925, filed Apr. 24, 1964, now U.S. Patent No. 3,248,396, which was a division of Ser. No. 260,923, filed Feb. 25, 1963, now U.S. Patent No. 3,219,612.

This invention relates to certain compounds which are N-acyl derivatives of cyclic imines, to some unique mixtures of N-acyl derivatives of cyclic imines, and to plastic compositions, the plasticizer component of which is at least one of the compounds or one of the unique mixtures that are the subject of this invention. More particularly, this invention relates to N,N-disubstituted long chain aliphatic amides the acyl component of which if saturated is an alkanoic acyl containing from 10 to 18 carbon atoms, and if unsaturated is an alkenoic acyl containing from 18 to 22 carbon atoms, the amide nitrogen in all cases being a member of a heterocyclic ring or in the case of a fused ring system one of the heterocyclic rings, all of the other ring members being carbon or nitrogen atoms.

This invention, in addition, relates to certain other new amide plasticizers wherein the acyl component is derived from dibasic alkanoic acids, from epoxidized alkanoic acids and from dimer acids.

This invention also relates to certain mixtures of the above-mentioned amides which individually or in combination with other mixtures of amides are compatible plasticizers for vinyl chloride resins.

We have discovered that the compounds and the mixtures of compounds that are the subject of this invention are good, compatible, solvent-type plasticizers for vinyl chloride resins. Moreover, the compounds and mixtures of compounds that are the subject of this invention are efficient primary solvent-type plasticizers which can be made from low price fatty acids and which exhibit good compatibility with and impart low volatility loss, resistance to microbial action, excellent low temperature properties, and stability to northern light exposure to polymer and copolymer resins of vinyl chloride.

The terms "vinyl type resins" and "vinyl chloride resin" are used throughout this specification and claim to refer to polymers and copolymers of monomers containing vinyl chloride in a predominant proportion by weight. Terms such as "compatible," "good compatibility," and "compatible plasticizer" in reference to the plasticizers which are the subject of this invention are used throughout the specification to refer to plasticizers that show no sign of exudation, migration to the surface, for at least two weeks when the plasticizers are present in the resin in proportions of about 70 parts by weight of plasticizer to 100 parts by weight of resin.

Not only are the compounds that are the subject of this invention useful as plasticizers for vinyl chloride resins, but they are also efficient, compatible softeners for Buna N rubber, imparting low volatility loss and excellent low temperature properties to the plasticized rubber compositions.

If a resin is plasticized with a compound with which it has only limited compatibility, the plasticizer soon exudes or migrates to the surface unless the plasticizer is used either in a limited amount or is used in conjunction with a mutual solvent (a compatible auxiliary plasticizer) to obtain adequate compatibility.

It is known in the art that compounds similar to those which are the subject of this invention exhibit reasonably good compatibility for hydrophyllic type resins but in order to obtain adequate flexibility must be employed together with a secondary or an auxiliary plasticizer as seen for example in United States Patent Number 2,339,056.

It would be expected from the recognized compatibility of compounds related to the type herein described with polyvinyl acetals (hydrophillic type resins), that these compounds would be quite incompatible with polymers of the vinyl chloride type. We have discovered, however, that not only are the particular compounds and compound mixtures herein described compatible as primary plasticizers with vinyl chloride reisns but as we note above they are compatible with the hydrophyllic type resins as well.

Not only are the particular compounds and mixtures of compounds herein described compatible vinyl type resin plasticizers, but the instant invention is considerably broader in that it also contemplates the use of the compatible (compatible with respect to the particular resin involved) binary, ternary, or multiple component mixtures of N-acyl cyclic imines of saturated, monounsaturated, and polyunsaturated acids such as can be derived from animal, fish, or vegetable fats and oils such as tallows, white greases, menhaden oil, cottonseed oil, soybean oil, rapeseed oil, *Crambe abyssinica* seed oil, jojoba oil, parsley seed, oil *Limnanthes Douglasii* seed oil, palm oil, *Vernonia anthelmintica* seed oil, castor oil, foots, or from tall oil acids or rosin acids, and other seed oils.

The N-acyl derivatives of this invention decrease in their degree of compatibility as the alkyl portion of the acyl group (if saturated) increases in chain length beyond 15 carbon atoms and they are incompatible when the chain length is 17 or more carbon atoms. In general, the compatibility of a mixture of N-acyl cyclic imines containing a considerable proportion of these less compatible or incompatible N-acyl cyclic imines can be improved by mixing with a compatible plasticizer or by reducing the proportion of the incompatible saturated constituent by such procedures as fractional distillation or fractional crystallization either before or after the amidation step in the preparation of the N-acyl cyclic imine mixture. Similarly, the N-acyl derivatives of this invention decrease in their degree of compatibility as the alkyl portion of the acyl group of the N-acyl derivative (if unsaturated) increases in unsaturation beyond monounsaturation. In general, the compatibility of such a polyunsaturated derivative or of a mixture of N-acyl cyclic imines containing such polyunsaturated acyls can be increased by mixing with a suitable amount of a compatible plasticizer or by decreasing the polyunsaturation of some or all of the polyunsaturated constituents either by physical means, such as fractionation, or by chemical means such as selective hydrogenation, cyanoethylation, halogenation, epoxidation, formylation, maleination, dimerization, cyclization, or the like either before or after the amidation step in the preparation of the N-acyl imine or N-mixed acyl cyclic imine. The specific component ratio of compatible compositions can be established according to the scheme set forth in our co-pending application Ser. No. 166,742, filed Jan. 15, 1962, now U.S. Patent 3,219,664, for example.

Also included among the operable N-acyl cyclic imines are those whose acyls are the acyls of the following groups of acids: alkanoic acids with substituents in the chain such as dichloro stearic acid; acyloxyacids such as 12-acetoxyoleic, 12-acetoxystearic and 9,10-diacetoxystearic acids and the like; 12-beta-cyanoethoxyoleic and 12-cyanoethoxystearic acids and the like; ricinoleic acid; phenylstearic acid; phenoxystearic acid; mono-, di-, or tri-epoxy stearic acids; mono- or diepoxy oleic acid; epoxydocosanoic acid; dimerized or trimerized linolenic, linoleic or oleic acid, etc., cyclic acids such as cyclized linoleic and/or linolenic acids; Diels-Alder adducts of such polyenoic acids as tung oil acids or soybean acids, the Diels-Alder adducts of tung oil acids with di-alkyl maleates, alkyl acrylates, acrylonitrile, fumaronitrile and the like; tall oil acids; and rosin or terpene-derived acids such as abietic, 1-pimaric, pinonic, pinic and the gamma-lactone of beta-hydroxyisopropyl pimelic acid; as well as the mono-alkyl esters of dibasic acids such as pinic, adipic, sebacic, brassylic, carboxystearic, phthalic, terephthalic and dialkyl phosphonostearic acids, and the like.

Terms such as "dimer acid," or "dimerized acids" are used indiscriminately to refer to acids or mixtures of acids consisting essentially of dibasic acids containing from 32 to 44 carbon atoms resulting from the polymerization or dimerization of along chain $C_{16}$ to $C_{22}$ unsaturated fatty acids. Terms such as "trimer acid," or "trimerized acids" are used indiscriminately to refer to acids or mixtures of acids consisting essentially of tribasic acids containing from 48 to 66 carbon atoms resulting from the polymerization or trimerization of long chain $C_{16}$ to $C_{22}$ unsaturated fatty acids.

Also anticipated are the N-acyl derivatives of the alkanol and polyalkanol cyclic imines wherein the alkanol or polyalkanol group is esterified by the same or a different acyl group from that acylating the imino nitrogen resulting in N-acyl (acyloxyalkyl)piperidines such as 1-oleoyl-4-(3-acetoxypropyl)piperidine and the like.

The compounds of the instant invention were tested for vinyl chloride-vinyl acetate (95–5) copolymer resin Vinylite(VYDR) and in polyvinylchloride (Geon 101) in a standard formulation comprising: 63.5% of Vinylite VYDR or Geon 101, 35% plasticizer, 0.5% stearic acid, and 1.0% basic lead carbonate. This formulation for each sample was milled, molded, and tested. In all examples, the sample was rated an incompatible if the molded stock showed any evidence of exudation or migration to the surface during a shelf storage of two weeks.

The compounds that are the subject of this invention are conveniently prepared by reacting the appropriate imine, which in every case is a cyclic imine where the nitrogen atom is a member of either the ring or a member of one of the rings if a fused ring compound is involved, with the appropriate acid or corresponding acid chloride. In any event, methods for preparing compounds such as those herein described are well known to those skilled in the art of fatty acid chemistry. The details of individual preparation are listed in the operating examples which follow:

Example 1.—N-oleoylpiperidine

Twenty-two and four tenths grams (0.26 mole) of piperidine were dissolved in 60 milliliters of benzene and 39.7 grams (0.13 mole) of oleoyl chloride were added dropwise with stirring. After stirring for an additional hour, the reaction mixture was filtered, washed successively with dilute hydrochloric acid and water, and dried over anhydrous sodium sulfate. Free acid was removed by percolating the benzene solution through a column of activated alumina and eluting the amide with a 1:1 ethanol-benzene mixture. The solvent was then removed by stripping under reduced pressure. Analysis of the product, N-oleoylpiperidine: Percent C, 78.15 (theory 78.95); percent H, 12.07 (theory 12.40); percent N, 4.04 (theory 4.04).

Example 2.—N-oleoylhexamethylenimine

N-oleoylhexamethylenimine was prepared by the procedure of Example 1 from 9.9 grams (0.10 mole) of hexamethylenimine, 30.0 grams (0.10 mole) of oleoyl chloride, and 8 grams (0.10 mole) of pyridine. Analysis of the product, N-oleoylhexamethylenimine: Percent C, 78.83 (theory 79.21); percent H, 12.11 (theory 12.46); percent N, 3.79 (theory 3.85).

Example 3.—N-oleoyl-2-methylpiperidine

A mixture of 31.6 grams (0.32 mole) of 2 - methylpiperidine, 60 grams (0.21 mole) of oleic acid, and 20 milliliters of benzene was refluxed in an apparatus equipped with a Dean-Stark trap until the evolution of water ceased. The reaction mixture was diluted with 150 milliliters of commercial hexane, washed successively with dilute hydrochloric acid and water, and dried over anhydrous sodium sulfate. Free acid was removed by percolating the hexane solution through a column of activated alumina, and eluting the amide with a 1:1 hexane-ethanol mixture. The solvent was removed by stripping under reduced pressure. Analysis of the product, N - oleoyl - 2 - methylpiperidine: Percent C, 78.87 (theory 79.20); percent H, 12.13 (theory 12.47); percent N, 3.86 (theory 3.85).

Example 4.—N-oleoyl-3-methylpiperidine

N - oleoyl - 3 - methylpiperidine was prepared by the procedure of Example 3 from 31.6 grams (0.32 mole) of 3 - methylpiperidine, and 60 grams (0.21 mole) of oleic acid. Analysis of the product, N - oleoyl - 3 - methylpiperidine: Percent C, 79.03 (theory 79.20); percent H, 12.30 (theory 12.47); percent N, 3.89 (theory 3.85).

Example 5.—N-oleoyl-4-methylpiperidine

N - oleoyl - 4 - methylpiperidine was prepared by the procedure of Example 3 from 31.6 grams (0.32 mole) of 4 - methylpiperidine and 60 grams (0.21 mole) of oleic acid. Analysis of the product, N - oleoyl - 4 - methylpiperidine: Percent C, 78.80 (theory 79.20); percent H, 12.08 (theory 12.47); percent N, 3.86 (theory 3.85).

Example 6.—N-oleoyl-4-ethylpiperidine

N - oleolyl - 4 - ethylpiperidine was prepared by the procedure of Example 3 from 14.4 grams (0.13 mole) of 4 - ethylpiperidine and 30 grams (0.11 mole) of oleic acid. Analysis of the product, N - oleoyl - 4 - ethylpiperidine: Percent C, 79.17 (theory 79.45); percent H, 12.62 (theory 12.45); percent N, 3.75 (theory 3.71).

Example 7.—N-oleoyl-4-nonylpiperidine

N - oleoyl - 4 - nonylpiperidine was prepared by the procedure of Example 3 from 27 grams (0.13 mole) of 4 - nonylpiperidine and 30 grams (0.11 mole) of oleic acid. Analysis of the product, N - oleoyl - 4 - nonylpiperidine: Percent C, 80.21 (theory 80.70); percent H, 12.67 (theory 12.80); percent N, 2.95 (theory 2.90).

Example 8.—N-oleoyl-2-methyl-5-ethylpiperidine

N - oleoyl - 2 - methyl - 5 - ethylpiperidine was prepared from 27 grams (0.21 mole) of 2 - methyl - 5- ethylpiperidine and 40 grams (0.14 mole) of oleic acid by Example 3, except that toluene was used as the entraining solvent. Analysis of the product, N - oleoyl - 2-methyl - 5 - ethylpiperidine: Percent C, 79.51 (theory 79.66); percent H, 12.40 (theory 12.51); percent N, 3.79 (theory 3.85).

Example 9.—Piperidide of selectively hydrogenated cottonseed oil fatty acids

The piperidide of selectively hydrogenated cottonseed oil fatty acids were prepared by the procedure of Example 3 from 18.6 grams (0.22 mole) of piperidine and 40 grams (0.14 mole) of selectively hydrogenated cottonseed oil fatty acids. (The selectively hydrogenated cottonseed oil fatty acids had an iodine value of 73.2, a thiocyanogen value of 68.0, and a neutralization equivalent of 274.) The product, the piperidides of selectively hydrogenated cottonseed oil fatty acids, had a nitrogen content of 4.08%.

Example 10.—Piperidide of an animal acids

The piperidide of "animal acids" (Neofat No. 65) was prepared by the procedure of Example 3 from 18.6 grams (0.22 mole) of piperidine and 40 grams (0.15 mole) of Neofat 65. (The "animal acids" consisted of a mixture of fatty acids having the following composition: 2% myristic, 26% palmitic, 16% stearic, 48% oleic, and 8% linoleic acids.) The product, the piperidide of animal acids, had a nitrogen content of 3.95%.

Example 11.—N-oleolylpyrrolidine

N - oleolylpyrrolidine was prepared by the procedure of Example 3 from 15.1 grams (0.21 mole) of pyrrolidine and 40 grams (0.14 mole) of oleic acid. Analysis of the product, N - oleolylpyrrolidine: Percent C, 77.81 (theory 78.67); percent H, 12.11 (theory 12.32); percent N, 4.30 (theory 4.17).

Example 12.—N-oleoyl-1,2,3,4-tetrahydroquinoline

N - oleoyl - 1,2,3,4 - tetrahydroquinoline was prepared from 15 grams (0.11 mole) of 1,2,3,4 - tetrahydroquinoline, 35 grams (0.11 mole) of oleoyl chloride, and 9.2 grams (0.11 mole) of pyridine by the procedure of Example 1, except that the free unreacted acid was removed by washing with 4% alcoholic KOH followed by water washings. Analysis of the product N - oleoyl - 1,2,3,4-tetrahydroquinoline: Percent C, 80.89 (theory 81.48); percent H, 10.91 (theory 10.81); percent N, 3.31 (theory 3.52).

Example 13.—N-oleoyl-2,6-dimethylpiperidine

N - oleoyl - 2,6 - dimethylpiperidine was prepared by the procedure of Example 1 from 30.1 grams (0.27 mole) of 2,6 - dimethylpiperidine, and 40 grams (0.13 mole) of oleoyl chloride. Analysis of the product, N - oleoyl-2,6 - dimethylpiperidine: Percent C, 79.19 (theory 79.12); percent H, 12.43 (theory 12.30); percent N, 3.74 (theory 3.72).

Example 14.—N-oleoylcarbazole

A mixture of 16.7 grams (0.10 mole) of carbazole, 30 grams (0.10 mole) of oleoyl chloride and 60 milliliters of xylene was refluxed for 4 hours. The reaction mixture was washed successively with dilute hydrochloric acid and water and dried over anhydrous sodium sulfate. Free acid was removed by percolating the xylene solution through a column of activated alumina and eluting the amide with a 1:1 ethanol-xylene mixture. The solvent was then removed by stripping under reduced pressure. Analysis of the product, N - oleolylcarbazole: Percent C, 82.98 (theory 83.40); percent H, 9.50 (theory 9.50); percent N, 3.24 (theory 3.25).

EXAMPLE 15

N-oleoyl-3-azabicyclo[3.2.2]nonane was prepared by the procedure of Example 12 from 12.5 grams (0.10 mole) of 3-azabicyclo[3.2.2]nonane, 30 grams (0.10 mole) of oleoyl chloride, and 8 grams (0.10 mole) of pyridine. Analysis of the product, N-oleoyl-3-azabicyclo-[3.2.2]nonane: Percent C, 79.20 (theory 80.09); percent H, 11.95 (theory 12.06); percent N, 3.40 (theory 3.60). Since the heterocyclic nitrogen is in the 3-position, the product can alternatively be named 3-oleoyl-3-azacicyclo-[3.2.2]nonane.

EXAMPLE 16

N - *palmitoylpiperidine*.—N - palmitoylpiperidine was prepared by the procedure of Example 3 from 19 grams (0.22 mole) of piperidine and 40 grams (0.15 mole) of palmitic acid. Analysis of the product, N-palmitoylpiperidine: Percent C, 78.02 (theory 77.88); percent H, 12.70 (theory 12.7); percent N, 3.89 (theory 4.33).

EXAMPLE 17

N,N' - *sebacoyldipiperdine*.—N,N' - sebacoyldipiperidine was prepared by the procedure of Example 3 from 78 grams (0.92 mole) of piperidine and 40 grams (0.20 mole) of sebacic acid, except that the free unreacted acid was removed by dissolving the reaction product in carbon tetrachloride, treating with a slight excess of 4% alcoholic KOH, and washing with water. Analysis of the product, N,N'-sebacoyldipiperine: Percent C, 71.35 (theory 71.31); percent H, 10.63 (theory 10.70); percent N, 8.18 (theory 8.32).

EXAMPLE 18

N - *stearoylpiperdine*.—N - stearoylpiperidine was prepared by the procedure of Example 3 from 27 grams (0.32 mole) of piperidine and 45 grams (0.16 mole) of stearic acid. Analysis of the product, N-stearoylpiperidine: Percent C, 78.50 (theory 78.49); percent H, 12.75 (theory 12.90); percent N, 3.96 (theory 3.98).

EXAMPLE 19

*Dipiperidide of dimer acid* (Empol 1014).—The dipiperidide of dimer acid was prepared by the procedure of Example 3 from 18.3 grams (0.22 mole) of piperidine and 40 grams (0.07 mole) of dimer acid (Empol 1014). The product, the dipiperidide of dimer acid, had a nitrogen content of 3.98%.

EXAMPLE 20

*Mixed piperidides of oleic acid*.—This was a physical mixture consisting of 3.6% by weight of the sample of Example 3, 46.4% by weight of the sample of Example 4, 35.7% by weight of the sample of Example 5, and 14.3% of the sample of Example 13.

EXAMPLE 21

N - *eurcoylpiperidine*.—N - eurcoylpiperidine was prepared by the procedure of Example 3 from 11.1 grams (0.13 mole) of piperidine and 40 grams (0.12 mole) of erucic acid. Analysis of the product, N - erucoylpiperidine: Percent C, 79.84 (theory 79.86); percent H, 12.61 (theory 12.67); percent N, 3.48 (theory 3.41).

EXAMPLE 22

N - *decanoyl - 4 - nonylpiperidine*.—N - decanoyl - 4-nonylpiperidine was prepared by the procedure of Example 3 from 53 grams (0.25 mole) of 4-nonylpiperidine and 40 grams (0.23 mole) of decanoic acid. Analysis of the product, N-decanoyl-4-nonylpiperidine: Percent C, 78.69 (theory 78.78); percent H, 12.90 (theory 12.96); percent N, 3.76 (theory 3.83).

EXAMPLE 23

N - *epoxystearoylpiperidine*.—N - epoxystearoylpiperidine was prepared by epoxidation of N-oleoylpiperidine using perbenzoic acid. The product, N - epoxystearoylpiperidine has an oxirane oxygen content of 4.49%.

EXAMPLE 24

*Piperidide of rapeseed oil fatty acids*.—The piperidide of rapeseed oil fatty acids was prepared by the procedure of Example 3 from 18.5 grams (0.22 mole) of piperidine and 60 grams (0.20 mole) of rapeseed oil fatty acids. The product, the piperidide of rapeseed oil fatty acids, had a nitrogen content of 3.56%.

EXAMPLE 25

*N,N' - dioleoyl - dipiperidinomethane.*—N,N' - dioleoyl-dipiperidinomethane was prepared by the procedure of Example 3 from 18.1 grams (0.10 mole) of dipiperidinomethane and 50 grams (0.18 mole) of oleic acid. Analysis of the product, N,N'-dioleoyl-dipiperidinomethane: Percent C, 78.52 (theory 79.30); percent H, 12.14 (theory 12.19); percent N, 3.94 (theory 3.94).

EXAMPLE 26

*N - oleoyl - 4(5 - nonyl)piperidine.*—N - oleoyl - 4(5-nonyl)piperidine was prepared by the procedure of Example 3 from 41.1 grams (0.19 mole) of 4-(5-nonyl)piperidine and 50 grams (0.18 mole) of oleic acid. Analysis of the product, N-oleoyl-4(5-nonyl)piperidine: Percent C, 80.62 (theory 80.70); percent H, 12.80 (theory 12.80); percent N, 2.99 (theory 2.90).

EXAMPLE 27

*Mixed piperidides of oleic acid.*—Mixed piperidides of oleic acid was prepared by the procedure of Example 3 from 55 grams (0.42 mole) of mixed piperidines (commercial by-product mixture of alkyl piperidines) and 100 grams (0.35 mole) of oleic acid. The product, the mixed piperidides of oleic acid, had a nitrogen content of 3.63%.

EXAMPLE 28

*N,N' - dioleoylpiperazine.*—N,N' - dioleoylpiperazine was prepared by the procedure of Example 3 from 9.2 grams (0.11 mole) of piperazine and 60 grams (0.21 mole) of oleic acid. Analysis of the product, N,N'-dioleoylpiperazine: Percent C, 77.77 (theory 78.04); percent H, 12.12 (theory 12.13); percent N, 4.64 (theory 4.55).

EXAMPLE 29

*N - oleoyl - N' - methylpiperazine.*—N - oleoyl - N'-methylpiperazine was prepared by the procedure of Example 1 from 23.3 grams (0.23 mole) of N-methylpiperazine and 35.0 grams (0.12 mole) of oleoyl chloride. Analysis of the product, N-oleoyl-N'-methylpiperazine: Percent C, 74.46 (theory 75.70); percent H, 11.63 (theory 12.07); percent N, 7.43 (theory 7.68).

EXAMPLE 30

*N,N' - didecanoylpiperazine.*—N,N' - didecanoylpiperazine was prepared by the procedure of Example 17 from 13.8 grams (0.16 mole) of piperazine and 60.2 grams (0.35 mole) of decanoic acid. Analysis of the product, N,N'-didecanoylpiperazine: Percent C, 73.15 (theory 73.09); percent H, 11.68 (theory 11.75); percent N, 7.07 (theory 7.09).

EXAMPLE 31

*Piperidide of cottonseed oil fatty acids.*—The piperidide of cottonseed oil fatty acids was prepared by the procedure of Example 3 from 18.6 grams (0.22 mole) of piperidine and 40 grams (0.14 mole) of cottonseed oil fatty acids. The product, the piperidide of cottonseed oil fatty acids, had a nitrogen content of 3.94%.

EXAMPLE 32

*N-linoleoylpiperidine.*—N-linoleoylpiperidine was prepared by the procedure of Example 3 from 20 grams (0.23 mole) of piperidine and 60 grams (0.21 mole) of linoleic acid. Analysis of the product, N-linoleoylpiperidine: Percent C, 79.00 (theory 79.40); percent H, 11.77 (theory 11.89); percent N, 3.92 (theory 4.03).

TABLE I

| Example No. | Plasticizer | Tensile strength, p.s.i. | 100% mosulus, p.s.i. | Elongation, percent | Brittle point, ° C. | Volatility loss, percent | Compatibility [1] |
|---|---|---|---|---|---|---|---|
| 1 | N-Oleoypiperidine | 2,670 | 1,170 | 390 | −47 | 1.18 | C |
| 1 | N-Oleoylpiperidine [2] | 2,990 | 1,400 | 330 | −41 | | C |
| 2 | N-Oleoylhexamethylenimine | 2,650 | 1,300 | 350 | −49 | | C |
| 3 | N-Oleoyl-2-methylpiperidine | 2,470 | 1,200 | 310 | −39 | 0.83 | C |
| 4 | N-Oleoyl-3-methylpiperidine | 2,500 | 1,170 | 330 | −43 | 0.79 | C |
| 5 | N-Oleoyl-4-methylpiperidine | 2,520 | 1,240 | 310 | −43 | 0.65 | C |
| 6 | N-Oleoyl-4-ethylpiperidine | 2,760 | 1,280 | 390 | −45 | 0.47 | C |
| 7 | N-Oleoyl-4-nonylpiperidine | 2,780 | 1,700 | 330 | −51 | 0.27 | C |
| 8 | N-Oleoyl-2-methyl-5-ethylpiperidine | 2,870 | 1,340 | 380 | −37 | 0.40 | C |
| 9 | Piperidide of hydrogenated cottonseed oil fatty acids | 2,660 | 1,220 | 370 | −45 | 0.38 | C |
| 10 | Piperidide of animal acids [3] | 2,710 | 1,180 | 370 | −39 | 0.88 | C |
| 11 | N-Oleoylpryrolidine | 2,400 | 990 | 370 | −47 | | C |
| 12 | N-Oleoyl-1,2,3,4-tetrahydroquinoline | 2,990 | 1,470 | 350 | −39 | | C |
| 13 | N-Oleoyl-2,6-dimethylpiperidine | 2,990 | 1,430 | 360 | −37 | | C |
| 14 | N-Oleoylcarbazole | 3,500 | 2,500 | 300 | −23 | | I |
| 15 | N-Oleoyl-3-azabicyclo[3.2.2] nonane | 3,000 | 1,580 | 310 | −35 | | C |
| 16 | N-Palmitoylpiperidine | 2,680 | 1,160 | 350 | −35 | | C |
| 16 | N-Palmitoylpiperidine [2] | 2,840 | 1,300 | 350 | −37 | | C |
| 17 | N,N'-Sebacoyldipiperidine | 3,040 | 1,650 | 330 | +7 | | C |
| 18 | N-Stearoylpiperidine | 2,770 | 1,290 | 360 | −29 | | I |
| 19 | Dipiperidide of dimer acid (Empol 1014) | 3,190 | 2,630 | 180 | −3 | | C |
| 20 | Mixed piperidides of oleic acid [4] | 2,730 | 1,290 | 350 | −43 | | C |
| 21 | N-Erucoylpiperidine | 2,890 | 1,380 | 400 | −49 | | C |
| 22 | N-Decanoyl-4-nonylpiperidine | 2,880 | 1,350 | 390 | −39 | | C |
| 23 | N-Epoxystearoylpiperidine | 2,810 | 1,180 | 340 | −21 | | C |
| 24 | Piperidide of rapeseed oil fatty acids | 2,750 | 1,300 | 340 | −53 | | C |
| 25 | N,N'-Dioleoyl-dipiperidinomethane | 2,840 | 1,190 | 390 | −49 | | C |
| 26 | N-Oleoyl-4(5-nonyl)piperidine | 2,990 | 1,750 | 340 | −39 | | C |
| 27 | Mixed piperidides of oleic acid [5] | 2,910 | 1,380 | 370 | −43 | | C |
| 28 | N,N-Dioleoylpiperzaine | 2,880 | 1,330 | 380 | −37 | | I |
| 29 | N-Oleoyl-N-methylpiperzaine | 2,510 | 1,810 | 280 | −43 | | I |
| 30 | N,N'-Didecanoylpiperazine | 2,830 | 1,770 | 250 | −23 | | I |
| 31 | Piperidide of cottonseed oil fatty acids | 2,560 | 1,200 | 330 | −45 | | C |
| 32 | N-Linoleoylpiperidine | | | | | | I |
| 33 | Piperidide of mixed acids [6] | | | | | | C |
| 34 | Piperidide of mixed acids [7] | | | | | | C |
| 35 | Piperidide of mixed acids [8] | | | | | | C |
| 36 | Piperidied of mixed acids [9] | | | | | | C |
| | Di-2-ethylhexylphthalate (control) | 3,050 | 1,690 | 330 | −33 | 1.99 | C |

[1] C=Compatible, I=Incompatible.
[2] Using poly (vinyl chloride) hemopolymer instead of Vinylite VYDR resin.
[3] 2% myristic acid, 26% palmitic acid, 16% stearic acid, 48% oleic acid, and 8% linoleic acid.
[4] Mixture of 3.6%, 46.4%, 35.7%, and 14.3% by weight of samples of Examples 3, 4, 5, and 13, respectively.
[5] Made from a commercial by-product mixture of alkyl piperidines.
[6] Mixture of 60% and 40% by weight of the samples of Examples 16 and 32, respectively.
[7] Mixture of 32.5%, 32.5%, and 35.0% by weight of the samples of Examples 1, 16, and 32, respectively.
[8] Mixture of 30%, 30%, and 40% by weight of the samples of Examples 1, 16, and 32, respectively.
[9] Mixture of 27.5%, 27.5%, and 45% by weight of the samples 1, 16, 32, respectively.

The samples of Examples 1 to 36, inclusive, were evaluated as plasticizers for Vinylite VYDR resin and the samples of Examples 1 and 16 were evaluated as plasticizers for Geon 101 using the afore-described formulations. The results are reported in Table I which includes the results for di-2-ethylhexylphthalate (DOP) as control.

The samples of Examples 1, 9, and 27 were evaluated as nitrile rubber (Hycar 1042–33% acrylonitrile) softeners. The formulation employed was as follows:

|  | Percent | Parts/100 parts of rubber |
|---|---|---|
| Nitrile rubber (33% acrylonitrile) | 52.8 |  |
| SRF black | 31.7 | 60.0 |
| Zinc oxide | 2.6 | 5.0 |
| Stearic acid | 0.79 | 1.5 |
| Sulfur | 0.79 | 1.5 |
| Accelerator | 0.79 | 1.5 |
| Softener | 10.6 | 20.5 |

These compositions were cured for 30 minutes at 310° F. None showed any signs of exudation in 15 days. The evaluation results are given in Table II which also includes the results for the control, dibutylsebacate (DBS).

burial tests using similar samples of VYDR resin plasticized with N-oleoylmorpholine as controls. After 29 days localized areas of discoloration indicating microbial attack appeared in the control. None of the other specimens showed any signs of discoloration after 56 days. After 85 days the samples plasticized with N-oleoylpiperidine, and N-oleoyl-2-methylpiperidine were completely discolored, the sample plasticized with the mixed piperidides of oleic acid showed only localized discoloration, and the sample plasticized with N-oleoyl-2,6-dimethylpiperidine showed no signs of discoloration.

Improved light stability and thermal stability can be attained by inclusion of suitable stabilizers and/or antioxidants in the resin-plasticizer formulation.

The soapy water extractability can be reduced by the use of additives such as hydrocarbons extenders.

We claim:
1. 3-oleoyl-3-azabicyclo[3.2.2]nonane.

TABLE II

| Example No. | 300% modulus, p.s.i. | | Tensile strength, p.s.i. | | Ultimate elongation, percent | | Hardness shore A | Brittle point, ° C. | Volatility, percent | Swelling, percent |
|---|---|---|---|---|---|---|---|---|---|---|
|  | Unaged | Aged | Unaged | Aged | Unaged | Aged |  |  |  |  |
| 1 | 600 | 990 | 1,940 | 2,140 | 710 | 510 | 50 | −48 | 0.52 | 22.2 |
| 9 | 560 | 1,000 | 1,850 | 1,950 | 700 | 510 | 52 | −48 | 0.96 | 22.5 |
| 27 | 590 | 1,050 | 1,910 | 1,930 | 680 | 500 | 53 | −48 | 0.94 | 22.9 |
| DBS (control) | 960 | 1,920 | 2,170 | 2,350 | 580 | 370 | 55 | −55 | 5.52 | 20.9 |

Samples of Vinylite VYDR resin plasticized with the N-oleoylpiperidine of Example 1, the N-oleoyl-2-methylpiperidine of Example 3, the mixed piperidides of oleic acid of Example 20, and the N-oleoyl-2,6-dimethylpiperidine of Example 13, respectively, were subjected to standard soil-

References Cited

UNITED STATES PATENTS 3,334,087   8/1967   Brown et al. _____ 260—239

ALTON D. ROLLINS, *Primary Examiner.*